(12) United States Patent
Abbasi et al.

(10) Patent No.: US 6,925,502 B1
(45) Date of Patent: Aug. 2, 2005

(54) METHODS AND SYSTEMS FOR IMPROVING DATA TRANSMISSION RATES HAVING ADAPTIVE PROTOCOLS

(75) Inventors: Salman Yousef Abbasi, Clifton, NJ (US); Vijay K. Bhagavath, Lincroft, NJ (US); Jackson Odondi, Jersey City, NJ (US); Zafer Sahinoglu, Clifton, NJ (US)

(73) Assignee: AT&T Corp., New York, NY (US)

( * ) Notice: Subject to any disclaimer, the term of this patent is extended or adjusted under 35 U.S.C. 154(b) by 1020 days.

(21) Appl. No.: 09/597,130

(22) Filed: Jun. 20, 2000

(51) Int. Cl.[7] .............................................. G06F 13/00
(52) U.S. Cl. ...................... 709/232; 709/234; 370/231
(58) Field of Search ................................. 709/200, 201, 709/220, 223, 224, 227, 231, 232, 233, 234, 709/235; 370/230, 231, 232, 233, 235

(56) References Cited

U.S. PATENT DOCUMENTS

| | | | |
|---|---|---|---|
| 4,841,526 A | * | 6/1989 | Wilson et al. |
| 4,970,714 A | * | 11/1990 | Chen et al. |
| 5,130,986 A | * | 7/1992 | Doshi et al. |
| 5,313,454 A | * | 5/1994 | Bustini et al. |
| 5,764,625 A | * | 6/1998 | Bournas |
| 5,943,480 A | * | 8/1999 | Neidhardt |
| 5,974,028 A | * | 10/1999 | Ramakrishnan |
| 6,038,216 A | | 3/2000 | Packer ........................ 370/231 |
| 6,076,113 A | * | 6/2000 | Ramanathan et al. |
| 6,078,564 A | * | 6/2000 | Lakshman et al. |
| 6,105,064 A | * | 8/2000 | Davis et al. |
| 6,215,792 B1 | * | 4/2001 | Abi-Nassif |
| 6,452,915 B1 | * | 9/2002 | Jorgensen |
| 6,570,848 B1 | * | 5/2003 | Loughran et al. |

* cited by examiner

Primary Examiner—Moustafa M. Meky

(57) ABSTRACT

Methods and systems are provided to improve the data transmission rate of a system executing an network protocol such as TCP, by adapting the protocol according to an error rate of the system. The technique includes first establishing a connection between a receiver and transmitter according to the network protocol including establishing a data window size, the window size being an indicator of the amount of data the receiver can receive. As data segments are received, the receiver counts the number of data segments received as well the number of errored octets produced by the physical layer of the network over specified time periods. For each time period, the receiver determines whether the window size of the receiver should be changed to improve the data communication rate based on the previous window size, the number of segments received and the number of errors measured. If the window size is changed, then the receiver reestablishes communication with the transmitter using the new window size, thus altering the network protocol to optimize the overall data transmission rate.

15 Claims, 4 Drawing Sheets

100

METHODS AND SYSTEMS FOR IMPROVING DATA TRANSMISSION RATES HAVING ADAPTIVE PROTOCOLS

BACKGROUND OF THE INVENTION

1. Field of Invention

This invention relates to methods and systems for adaptively changing network protocol to improve data transmission rates.

2. Description of Related Art

Data networks are controlled by network protocols which are commonly classified into various layers including a physical layer, a data link layer and a network layer. Because physical systems are imperfect, noise such as near-end cross talk and impulse noise in a network's physical layer can corrupt a data stream as it traverses the network. As a result, segments of data received from the network can be inundated with errors.

While the data link layer of a network can correct various errors introduced by the physical layer by using error-correction techniques such as trellis and Reed-Solomon coding, these error-correction techniques have an upper limit on the number of bit errors that can be corrected for a data segment of a specified size. If the number of errors exceeds this upper bound, then a data segment cannot be completely corrected.

Transmission control protocol (TCP) is a common network protocol designed to fit into the layered hierarchy of protocols. TCP transmits data across a network by packaging the data into segments of various predetermined sizes and calling on another protocol such as the Internet Protocol (IP) layer to transmit each segment to a destination. On the receive side, the TCP stack layer places the received segments into the receiver's buffer and notifies the receiver's user. However, if a TCP data segment is corrupted, then the segment must be retransmitted. While larger TCP segments can transmit data faster than smaller TCP segments in a noiseless environment, transmitting data using larger TCP segments can slow data throughput in the presence of noise. Accordingly, there exists a need for methods and systems that adapt the size of TCP segments based on the number of errors produced by the physical network.

SUMMARY OF THE INVENTION

The invention provides methods and systems for optimizing the data transmission rate over a network using an adaptive network protocol. A receiver executing the network protocol first establishes a connection with a transmitter according to the network protocol. The connection includes establishing a window size, which is an indicator of the amount of data the receiver can receive.

As data segments are received, the receiver counts the number of data segments received, as well the number of errored octets produced by the physical layer of the network over a number of specified time periods. For each time period, the receiver determines whether a sufficient number of segments were received. If a sufficient number of segments were received, then the receiver makes another determination as to whether the window size of the receiver should be changed based on the number of errored octets. If the receiver determines that the window size should be changed, then the receiver changes its window size, notifies the transmitter of the changed window size and reestablishes communication based on the new window size, thus altering the network protocol to optimize the overall data transmission rate.

BRIEF DESCRIPTION OF THE DRAWINGS

The invention is described in detail with regard to the following figures, wherein like numerals reference like elements, and wherein.

DETAILED DESCRIPTION OF PREFERRED EMBODIMENTS

Figure 1:
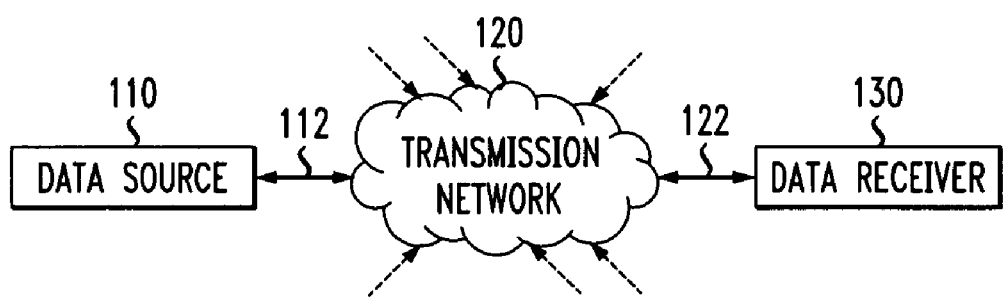
FIG. 1 is a block diagram of an exemplary data transmission system according to the present invention.

FIG. 1 shows a block diagram of an exemplary transmission system 100 capable of adapting its transmission protocol according to the present invention. The transmission system 100 includes a transmission network 120 connected to a data source 110 through a first link 112 and to a data receiver 130 through a second link 122.

In operation, the transmission network 120 provides a communication path between the data source 110 and the data receiver 130 using a network protocol. The data source 110 transmits data to the transmission network 120 over link 112. Subsequently, the data received by the transmission network 120 is relayed to the data receiver 130 over link 122. As data is transmitted from the data source 110 to the data receiver 130, the data receiver 130 can notify the data source 110, using the transmission network 120 and links 112 and 122, that the data was successfully or unsuccessfully received.

The data source 110 of the exemplary system 100 can be a personal computer executing Transmission Control Protocol (TCP) operating over Internet Protocol (IP), commonly referred to together as TCP/IP. However, the data source 110 can also be any one of a number of different types of data sources, such as a computer, a storage device, or any combination of software or hardware capable of generating, relaying, or recalling from storage data capable of being transmitted, directly or indirectly, to a transmission network, or medium, using a network protocol.

As mentioned above, the exemplary data source 110 sends data using TCP. Accordingly, the data transmitted by the data source 110 is packaged in segments of various predetermined sizes according to the TCP protocol requirements. However, because protocols change over time, and new protocols may emerge, it should be appreciated that the data source 110 can transmit data according to any protocol having a set of predetermined segment sizes without departing from the spirit and scope of the present invention.

According to the TCP protocol, the data source 110 can receive messages from the data receiver 130 that each segment sent by the data source 110 and received by the receiver 130 was successfully received and without errors. Additionally, the data source 110 can receive messages from the data receiver 130 that particular segments sent by the data source 110 and received by the receiver 130 contained errors or were not successfully received. If the data source 110 receives the message that a particular segment was corrupted, then the data source 110 re-transmits the particular segment until a valid segment is successfully received.

The transmission network 120 of the exemplary embodiment can be the Internet running IP protocol. However, the transmission network 120 can also be a wide area network or a local area network, an intranet, any subset of the Internet, or any distributed processing network or system. In general, the transmission network 120 can be any known or later developed transmission medium, computer program, or structure usable to transmit data from the data source 110 to the data receiver 130.

The data receiver 130 of the exemplary system 100 can be a personal computer receiving data using a cable, a digital subscriber line (XDSL) modem and TCP/IP protocol. However, the data receiver 130 can also be any device capable of receiving data according to any predetermined network protocol, such as a computer, a storage device, or any combination of software and hardware capable of receiving, relaying, storing, or sensing data without departing from the spirit and scope of the present invention.

As discussed above, the data receiver 130 receives data according to TCP. Accordingly, data segments received by the data receiver 130 can be of various predetermined sizes according to the TCP protocol requirements. However, it should be appreciated that because protocols change over time and new protocols can emerge, the data receiver 130 can receive data according to any protocol having a set of predetermined segment sizes without departing from the spirit and scope of the present invention. Additionally, as another aspect of TCP, the data receiver 130, upon reception of a data segment, can transmit messages to the data source 110 indicating whether a data segment was or was not successfully received and valid.

The links 112 and 122 can be any known or later developed device or system for connecting the data source 110 or the data receiver 130 to the transmission network 120. Such devices include direct serial/parallel cable connections, wireless connections, satellite links, connections over a wide area network or a local area network, connections over an intranet, connections over the Internet, or connections over any other distributed processing network or system. Additionally, the links 112 and 122 can be software devices linking various software systems. In general, the links 112 and 122 can be any known or later developed connection system, computer program, or structure usable to connect the data source 110 or the data receiver 130 to the transmission network 120.

Figure 2:
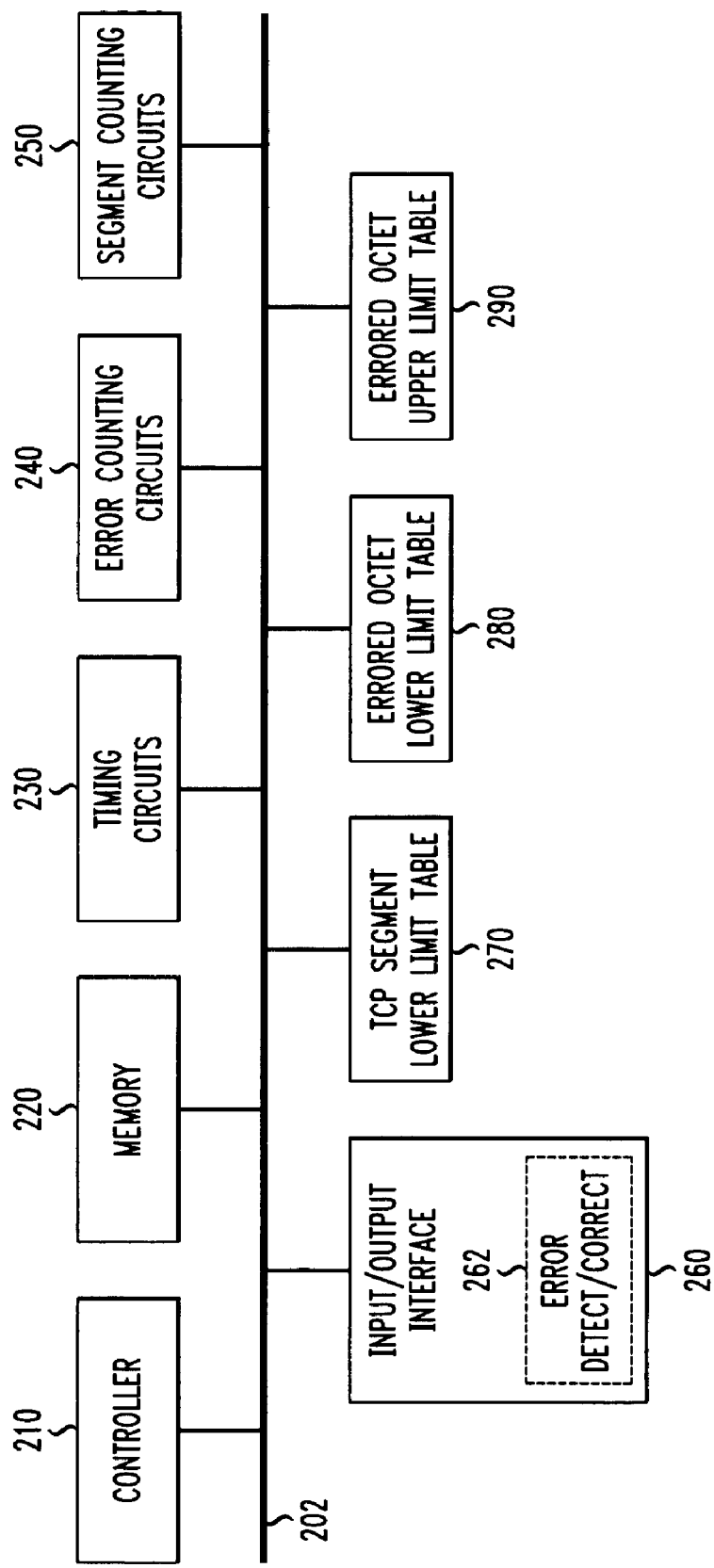
FIG. 2 is a block diagram of the exemplary receiver of FIG. 1.

FIG. 2 is an exemplary block diagram of the data receiver 130 of FIG. 1. The data receiver 130 includes a controller 210, a memory 220, timing circuits 230, error counting circuits 240, data segment counting circuits 250, an input/output interface 260 having an error detection/correction device 262, a TCP segment lower limit table 270, an errored octet lower limit table 280 and an octet upper error limit table 290. The above components are coupled together by control/data bus 202.

In operation, the data receiver 130 first establishes a network link to a data source 110 according to the TCP protocol. As described above, establishing the network link includes establishing the window size of the data receiver 130. The window size of a receiver is an indication as to the maximum amount of data that the data receiver 130 can accommodate. The larger the window size, the larger the data segments the data receiver 130 can receive. Once the network link is established, the receiver 130 can receive data segments of a size according to the receiver's window size. For example, a receiver 130 having a window size of 24,576 bits can receive data segments from the data source 110 of no more than 24,576 bits. Likewise, receiver 130 having a window size of 8,192 bits can receive data segments from the data source 110 of no more than 8,192 bits.

During data reception, the controller 210 receives data segments from an external data source using the input/output interface 260 and stores each segment in memory 220. The input/output interface 260 of the exemplary embodiment includes a modem (not shown) capable of connecting to a digital subscriber line (xDSL) which is in turn connected to a peripheral circuit of a personal computer.

Because all physical data transmission systems are subject to producing errors, the error detection/correction device 262 can monitor the received data segments, detect errors within the segments, and correct a number of errors, if any, within the data segments. The error detection/correction device 262 of the exemplary input/output interface 260 shown in FIG. 2 is contained within the modem. However, the error detection/correction device 262 can reside anywhere within the receiver 130 or can even be a stand-alone device without departing from the spirit and scope of the present invention.

Additionally, while the exemplary error detection/correction device 262 uses a trellis coding error detection/correction technique, the error detection/correction device 262 can use any combination of error detection and/or error-correction techniques to measure, reduce or eliminate the number of errors introduced by the physical layer of the data transmission system 120, such as convolutional, BCH, Reed-Solomon and turbo coding and the like, without departing from the spirit and scope of the present invention.

However, any error-correction technique has an upper limit on the number of bit errors that can be corrected for a segment. If the upper limit of errors is not exceeded for a data segment, then the error detection/correction device 262 can correct the errors, if any, and the input/output interface 260 can pass a valid data segment to the controller 210. However, if the upper limit of errors for a data segment is exceeded, the error detection/correction device 262 cannot correct all the errors and the input/output interface 260 will pass a corrupted data segment to the controller 210.

While the input/output interface 260 of the exemplary embodiment includes a modem connected to an xDSL line, it should be appreciated that the input/output interface can include a direct cable interface, a LAN connection, a WAN connection and the like. In general, the input/output interface 260 can include any known or later developed devices suitable for receiving and transmitting data without departing from the spirit and scope of the present invention.

As each data segment is passed to the controller 210, the controller 210 determines whether the segments are valid (i.e., whether the error detection/correction device 262 successfully removed all errors). If a segment is valid, the controller 210 passes the information within the data segment to a user (not shown). However, if a segment is corrupted, the controller 210 sends an indication to the source of the data segment that the data segment was unsuccessfully received. The data segment is then retransmitted to the receiver 130 until the segment is correctly received.

Given that the data segments of the exemplary receiver 130 are formatted according to the TCP protocol, the controller 210 of the exemplary receiver 130 uses a checksum to measure the validity of the TCP data segments. However, as protocols evolve and new protocols develop, any technique to check the validity of a data segment can be used without departing from the spirit and scope of the present invention.

As the receiver 130 receives data segments and checks the data segments' validity, the timing circuits 230 repetitively measure time periods of predetermined lengths. During each time period, the data segment counting circuits 250 count the number of TCP segments received by the receiver 130.

Also during each time period, the error counting circuits 240 count the number of errored octets in all the TCP segments received. An octet is eight bits of data and an octet is erroneous if one or more of the eight bits is corrupted. The error counting circuits 240 can measure the errored octets directly or the error counting circuits 240 can query another device such as the error detection/correction device 262 or a modem in the input/output interface 260. While the exemplary error counting circuits 240 query the error detection/correction device 262 for errored octet information, it should be appreciated that the error counting circuits 240 can receive error-information from any device capable of measuring errors without departing from the spirit and scope of the present invention.

Upon expiration of each time period, the controller 210 compares the number of data segments counted by the data segment counting circuits 250 to a value in the TCP segment lower limit table 270. The exemplary TCP segment lower limit table 270 contains a set of numbers, each number associated with each TCP window size which ranges from 8,192 bits to 65,536 bits in increments of 8,192 bits as defined by the TCP. The controller 210 can then make a determination whether a sufficient number of data segments were received during the predetermined time period using the TCP segment lower limit table 270. For example, for a predetermined time period of ten seconds, suppose the receiver 130 receives one hundred TCP segments, each TCP segment being 16,394 bits. The controller 210 can then access the TCP segment lower limit table 270 for the lower limit associated with 16,394 bit segment sizes. If the number of segments received exceeds the number provided by the TCP segment lower limit table, then the controller 210 can make further determinations as to whether the receiver's window size can change; otherwise the receiver's window size can remain unaffected.

If the controller 210 determines that a sufficient number of TCP segments were received, the controller 210 can make a determination whether to increase the receiver's window size. To make this determination, the controller 210 can compare the errored octets counted by the error counting circuits 240 against the errored octet lower limit table 280. The exemplary errored octet lower limit table contains a set of values associated with each acceptable TCP window size. If the number of errored octets counted by the error counting circuits 240 is less than the respective value in the errored octet lower limit table 280 for the present window size, then the controller 210 can increase the TCP window size; otherwise the controller 210 can leave the TCP window size unaffected.

If the controller 210 determines that the TCP window size should not be increased, the controller 210 can then make another determination as to whether the TCP window size should be decreased. To make this determination, the controller 210 compares the number of errors counted by the error counting circuits 240 against the errored octet upper limit table 290, which contains values associated with each acceptable TCP window size. If the number of errors counted by the error counting circuits 240 exceeds the respective value in the errored octet upper limit table 290, then the controller 210 can decrease the TCP window size of the receiver 130; otherwise the window size can remain unaffected. By increasing or decreasing the TCP window size as required, the transmission protocol adapts to the errors produced during transmission with the end result being an increased throughput of information from the transmitter 110 to the receiver 130.

Because TCP protocol does not recognize TCP segment sizes smaller than 8,129 bits or greater than 65,536 bits, it should be appreciated that, if the present TCP window size of the receiver 130 is presently at 8,192 bits, then the window size should not decrease further. Similarly, if the TCP window size is currently 65,536 bits, then the TCP window size should not further increase. However, because these window size limits are merely a design choice, it should be appreciated that any limitations regarding window size can be changed or eliminated without departing from the spirit and scope of the present invention.

While the exemplary receiver 130 uses errored octets to make its determinations on the appropriate window size, it should be appreciated that the error counting circuits 240 can measure any single type or combination of error conditions. Such error conditions can include the proportion of errored octets compared to the total data received, the number of single bit errors, statistical distributions of errors and the number of corrupted TCP segments and the like. In general, the error detection/correction device 262 and the error counting circuits 240 can measure and count any combination of error conditions suitable for determining an advantageous TCP window size without departing from the spirit and scope of the present invention.

Figure 3:
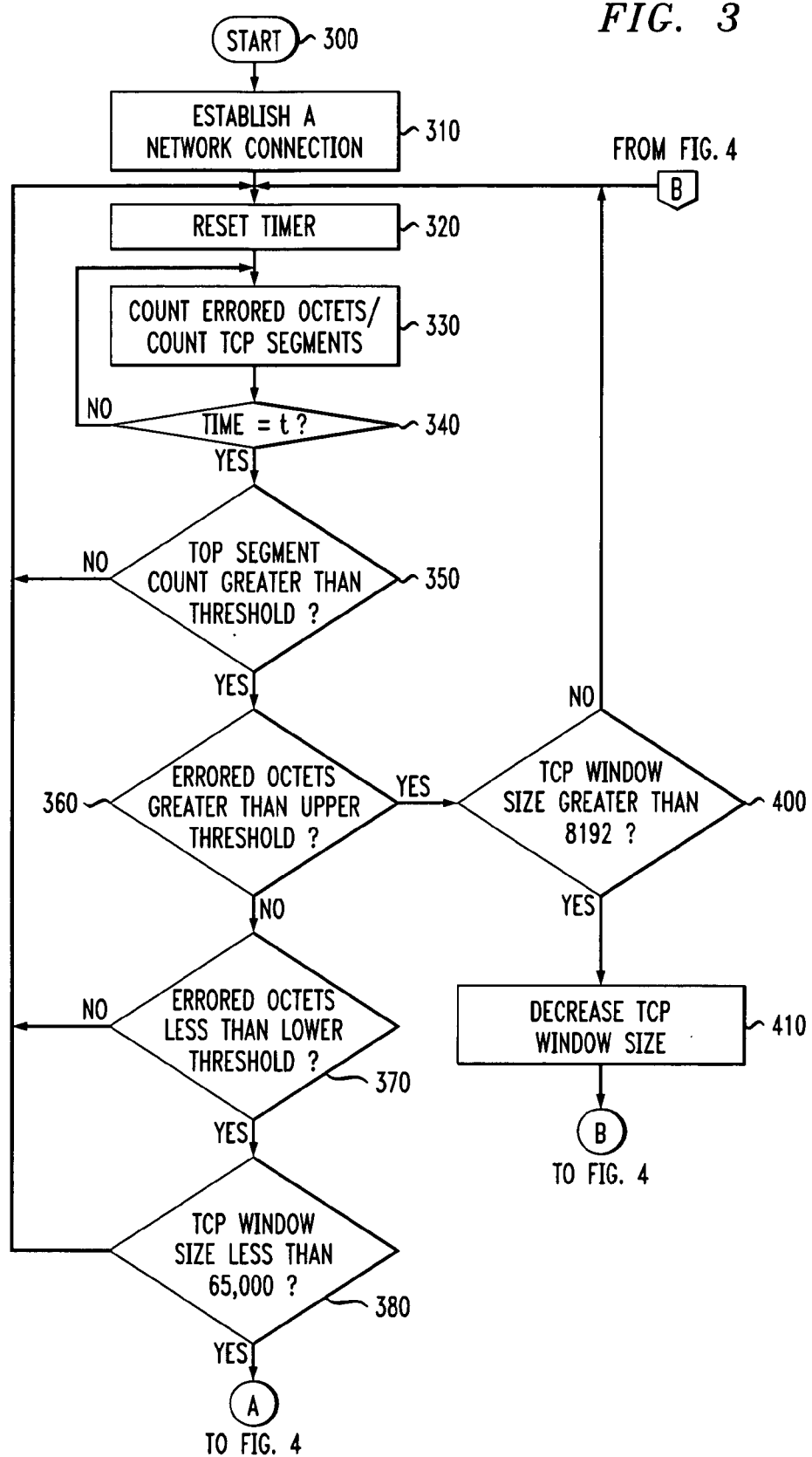
FIGS. 3 and 4 depict a flowchart outlining an exemplary method to optimize data transmission rates according to the present invention.
Figure 4:
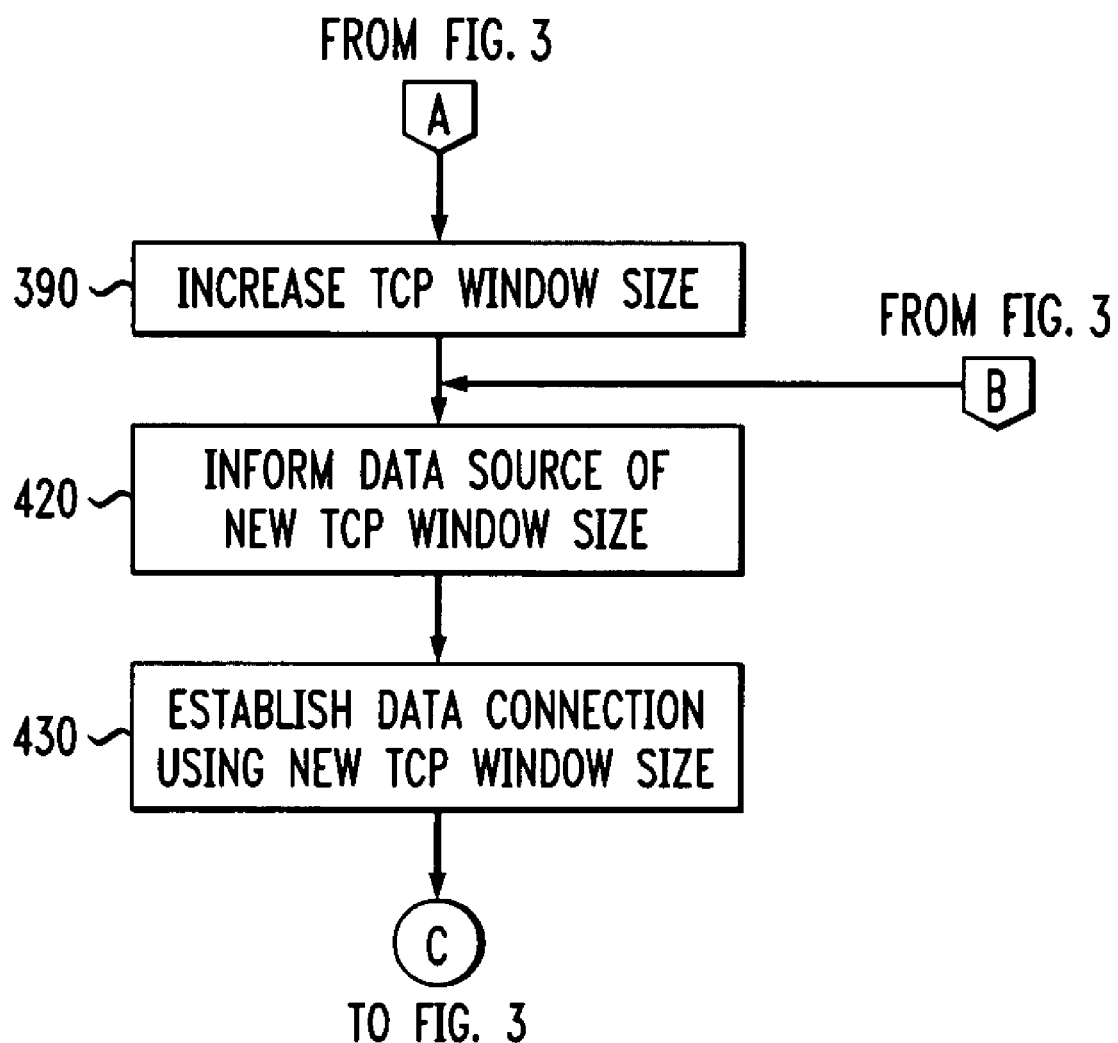

FIGS. 3 and 4 depict a flowchart outlining an exemplary method for adaptively changing a network protocol, including determining an optimum TCP window size, according to the present invention. The process starts at step 300 and continues to step 310 where a network connection is established between a device capable of transmitting data segments and a device capable of receiving data segments. While the exemplary method uses a TCP network protocol, any protocol now known or later developed that uses a window size or any other technique that determines the maximum amount of data that can be received at any time by a receiver can be used without departing from the spirit and scope of the present invention. The process continues to step 320.

In step 320, a timer that measures predetermined time periods is reset. Next, in step 330 the number of errored octets for the predetermined time period is counted. Additionally, the number of TCP segments received is also counted for the same time period. While the exemplary method measures errors by counting the number of corrupted octets of the received segments before any error-correction technique is applied to the received data segments, other measures of error such as the total number of bit errors, distributions of errors and the total number of corrupted TCP segments can be used without departing from the spirit and scope of the present invention. The process continues to step 340.

In step 340, a determination is made as to whether the predetermined time period has expired. If the predetermined time period has lapsed, then the process continues to step 350; otherwise the process returns to step 330 where the number of erroneous octets and TCP segments are further counted.

In step 350, because the predetermined time period is lapsed, a determination is made as to whether a minimum number of TCP segments were received during the predetermined time period. If a sufficient number of TCP segments were received, the process continues to step 360; otherwise the process returns to step 320 where the timer is reset for the next predetermined time period. In the exemplary method, the TCP segment number threshold can vary as a function of the TCP window size. However, it should be appreciated that the threshold for each window size can be constant for all TCP window sizes without departing from the spirit and scope of the present invention.

In step 360, because a sufficient number of TCP segments were received, a determination is made as to whether the number of errored octets counted in step 330 exceeds a predetermined upper threshold. If the number of errored octets exceeds the predetermined upper threshold, then the process continues to step 400; otherwise the process continues to step 370. In the exemplary method, the predetermined upper threshold of errored octets can vary with different TCP window sizes. However, the upper threshold of errored octets can be constant for all TCP window sizes without departing from the spirit and scope of the present invention.

In step 400, because the number of errored octets exceeded the upper threshold, a determination is made as to whether the TCP window size is greater than 8,192 bits. If the TCP window size is greater than 8,192 bits, then the process continues to step 410; otherwise the process returns to step 320 where the timer is reset for the next predetermined time period.

In step 410, because the TCP window size was greater than 8,192 bits, the TCP window size is decreased. In the exemplary method, the TCP window size is reduced to the next lowest acceptable value according to the TCP protocol. By decreasing the TCP window size, the transmission protocol adapts to the errors produced during transmission with the end result being an increased throughput of information. While the TCP protocol dictates that window sizes vary by 8,192 bit increments, it should be appreciated that, because protocols change and new protocols are developed, the window increment size can be any amount without departing from the spirit and scope of the present invention. The process then continues to step 420 (FIG. 4).

In contrast, in step 370, because the number of errored octets did not exceed the upper threshold, a determination is made as to whether the number of errored octets is less than a predetermined lower threshold. If the number of errored octets is less than the lower threshold, then the process continues to step 380; otherwise the process returns to step 320 where the timer is reset for the next predetermined time period. While the exemplary method limits the TCP window size to be no less than 8,192 bits, this requirement is driven by the TCP protocol standard. Accordingly, it should be appreciated that the lower limit of a window size can be any value without departing from the spirit and scope of the present invention.

In step 380, because the number of errored octets is less than the lower threshold, a determination is made as to whether the TCP window size is less than 65,536 bits. If the TCP window size is less than 65,536 bits, then the process continues to step 390 (FIG. 4); otherwise the process returns to step 320 where the timer is reset for the next predetermined time period.

In step 390, because the TCP window size is less than 65,536 bits, the TCP window size is increased. By increasing the TCP window size, the transmission protocol adapts to the errors produced during transmission with the end result being an increased throughput of information. In the exemplary embodiment, the TCP window size increases in steps of 8,192 bits according to the TCP protocol standard. However, it should be appreciated that, because protocols change over time and new protocols develop, the window decrement size can vary without departing from the spirit and scope of the present invention. The process continues to step 420.

In step 420, the data source of the TCP segments is informed of the new TCP window size. Next, in step 430, the connection between the data source and data receiver is reestablished using the new TCP window size. Next, the process returns to step 320 where the timer is reset for the next predetermined time period.

As shown in FIG. 2, the methods of this invention are preferably implemented using a general purpose computer such as a personal computer with peripheral integrated circuit elements and dedicated communication hardware. However, the receiver 130 can be implemented using any combination of one or more programmed special purpose computers, programmed microprocessors or micro-controllers and peripheral integrated circuit elements, ASIC or other integrated circuits, digital signal processors, hardwired electronic or logic circuits such as discrete element circuits, programmable logic devices such as a PLD, PLA, FPGA or PAL, or the like. In general, any device capable of implementing a finite state machine that is in turn capable of implementing the flowchart shown in FIGS. 3 and 4 can be used to implement the receiver 130.

It should also be understood that each of the various tables 270, 280 and 290 of the exemplary receiver 130 can reside on a high-speed memory such as a static random access memory. Furthermore, the various tables 270, 280 and 290 can reside on part of the memory 220 of the receiver 130. However, these tables 270, 280 and 290 can reside on any computer readable storage medium including a CD ROM, floppy disk, hard disk, read only memory (ROM), dynamic ram, flash memory and the like, without departing from the spirit and scope of the present invention.

It should also be understood that each of the circuits shown in FIG. 2 can be implemented as portions of a suitably programmed general purpose computer. Alternatively, each of the circuits shown in FIG. 2 can be implemented as physically distinct hardware circuits within an ASIC, or using a FPGA, a PDL, a PLA, or a PAL, or discrete logic elements or discrete circuit elements. The particular form that each circuit shown in FIG. 2 will take is a design choice and will be obvious and predictable to those skilled in the art.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. Thus, there are changes that may be made without departing from the spirit and scope of the invention.

What is claimed is:

1. A method for increasing a data transmission rate at a terminal, comprising:
    establishing a window size, the window size being an indicator of an amount of data the terminal can receive;
    receiving a plurality of data segments in accordance with the window size;
    measuring an error condition of the plurality of data segments over a specified time period; and
    changing the window size of the terminal based on the error condition to improve the data transmission rate between a transmitter and the terminal.

2. The method of claim 1, wherein changing the window size of the terminal is further based on a number of the data segments received.

3. The method of claim 1, wherein the error condition is a number of errored octets of the plurality of data segments.

4. The method of claim 1, wherein the terminal has a network protocol which is a transmission control protocol (TCP).

5. The method of claim 1, further comprising informing the transmitter of transmitted data segments of a second window size.

6. The method of claim 5, further comprising receiving a second plurality of data segments in accordance with the second window size.

7. A method for increasing a data transmission rate at a receiver, comprising:
   establishing a first window size, the first window size being an indicator of an amount of data the receiver can receive;
   transmitting first transmitted data to the receiver in accordance with the first window size;
   receiving information from the receiver to transmit data in accordance with a second window size of the receiver; and
   transmitting second transmitted data to the receiver in accordance with the second window size to improve the data transmission rate between a transmitter and the receiver, wherein the second window size is based on an error condition of the first transmitted data received by the receiver.

8. The method of claim 7, wherein the second window size is based on a number of data segments of the first transmitted data received by the receiver.

9. The method of claim 7, wherein a first and second network protocols associated with a receiver are a transmission control protocol (TCP).

10. An apparatus that adapts a protocol to increase a data transmission rate, comprising:
    a receiver that receives data segments in accordance with the protocol, the protocol having a receiver window size, the receiver window size being an indicator of an amount of data the receiver can receive;
    a timing device that measures a specified time period;
    an error detector that measures an error condition of the received data over the specified time period; and
    a controller that adapts the protocol, by changing the receiver window size, based on the error condition of data segments received to increase the data transmission rate.

11. The apparatus of claim 10, further comprising a segment counting device that counts a number of data segments received by the receiver over the specified time period, and wherein the controller adapts the protocol further based on a number of data segments received.

12. The apparatus of claim 10, wherein the protocol is a transmission control protocol (TCP).

13. An apparatus that adapts a protocol to increase a data transmission rate, comprising:
    a transmitter that transmits data segments of a size in accordance with the protocol, the protocol having a window size, a window size being an indicator of an amount of data a receiver can receive;
    a receiving device that receives information about the protocol including a second window size of the receiver, the second window size being based on an error condition of transmitted data segments;
    a controller that changes the size of the data segments transmitted by the transmitter in accordance with the second window size to increase a data transmission rate.

14. The apparatus of claim 13, wherein the controller adapts the protocol based further on a number of data segments received by the receiver.

15. The apparatus of claim 13, wherein the protocol is a transmission control protocol (TCP).

* * * * *